Figure 1:
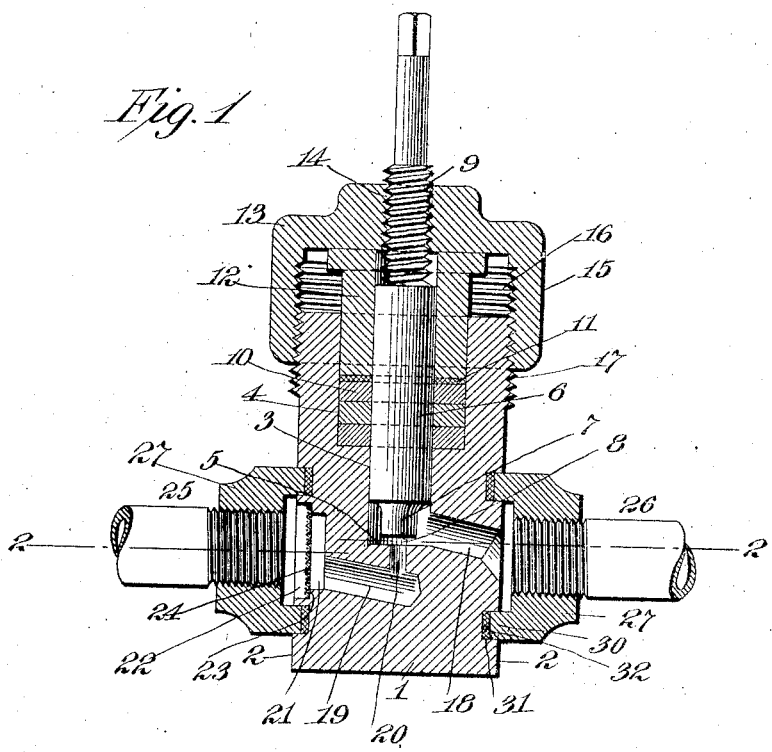

No. 854,133. PATENTED MAY 21, 1907.
R. WHITAKER.
VALVE.
APPLICATION FILED JAN. 11, 1904.

Witnesses:
Jas. F. Coleman
Jno. Robt Taylor

Inventor
Richard Whitaker
by           
Attorneys.

UNITED STATES PATENT OFFICE.

RICHARD WHITAKER, OF NEW BRUNSWICK, NEW JERSEY, ASSIGNOR, BY DIRECT AND MESNE ASSIGNMENTS, TO BRUNSWICK REFRIGERATING COMPANY, A CORPORATION OF NEW JERSEY.

VALVE.

No. 854,133.     Specification of Letters Patent.     Patented May 21, 1907.

Application filed January 11, 1904. Serial No. 188,614.

*To all whom it may concern:*

Be it known that I, RICHARD WHITAKER, a citizen of the United States, residing in the city of New Brunswick, county of Middlesex, and State of New Jersey, have invented a certain new and useful Improvement in Valves, of which the following is a description.

My present invention relates to improvements in valves, and especially expansion valves, of that type which is characterized by a body having a valve seat and a threaded stem, which is brought into engagement with the seat by being rotated.

The objects of the invention are to reduce the cost of manufacture, and to reduce the number of parts of the valve.

Another object is to make a valve which may be readily taken apart and the internal parts rendered accessible.

Another object is to provide means for permitting the removal of the gland cover without impairing the adjustment of the stem.

Another object is to prevent the choking of the valve when used as an expansion valve for ammonia refrigerating machines, by deposits within the pipes.

Another object of the invention is to provide means for securing the pipe carrying members together, and to the valve.

The invention comprises a body with a longitudinal extended cylindrical opening, for the reception of the valve stem, the lower end of the opening forming the valve seat. The valve stem is provided with a face and a screw-threaded portion, which latter engages with a cover. Surrounding the stem is a gland and packing rings of the ordinary kind. The cover is provided with an annular depending portion, having screw threads which engage with the threads formed upon the valve body. The threads upon the valve body and upon the valve stem are of the same pitch, and therefore both sets of threads on the cover are the same pitch, so that it may be removed or replaced without varying the adjustment of the valve stem, or changing the relation of the valve face to the seat. The central opening communicates with the outside of the body by means of a short passage or port, while upon the opposite face of the body, but beyond the valve seat, is another passage or port which extends to a point adjacent to the medial line of the body. This latter passage communicates with the central opening and valve seat by a short passage, which is preferably smaller than the central opening, so that the valve seat will not be destroyed. Both of the lateral passages or ports are preferably diagonally arranged, so that their outer extremities will be upon the same lateral plane. The lateral passage which serves to admit gas to the valve,—when the valve is designed and used as an expansion valve, is provided with an enlarged chamber, within which is removably secured a screen, which will absorb all foreign matters from the tubes, compressors, etc., before they reach the valve.

The members which carry the pipes are each in the form of a tie plate, and each has an annular flange which engages with an annular seat formed upon opposite faces of the valve body, and surrounding the lateral passages or ports. A gasket may be arranged within each of the annular seats, and the pipe members are secured together and in engagement with the valve seat by tie bolts, preferably two in number, one on each side of the valve body.

In order to better understand the nature of the invention, attention is directed to the accompanying drawing, showing one embodiment thereof, as applied to an expansion valve.

Figure 2:
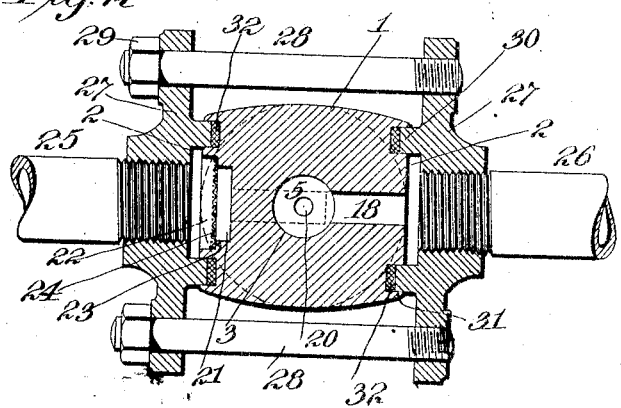

Figure 1 is a central longitudinal section of Fig. 2, and Fig. 2 is a horizontal section taken on the line 2—2 of Fig. 1.

In all of the several views like parts are designated by the same numerals of reference.

The body 1 is of the general shape shown, that is to say, its upper portion is of round section, while the lower half is somewhat flattened, forming plane opposing faces 2, 2. Within the body 1 is a cylindrical central opening 3 of comparatively large size, and an enlargement 4 of said opening, of much larger size. The lower end of the opening 3 forms the valve seat 5, and is turned off square and true for this purpose.

Within the opening 3 is the valve stem 6, which is cylindrical and makes a close fit with the opening 3 and is guided and supported thereby. The lower end of the stem is contracted at 7, and its lower extremity is finished true, so as to form the valve face 8. The contracted portion 7 of the stem is for the purpose of permitting the gas, which passes by the valve face, to enter the discharge passage, which will be described.

The upper portion of the valve stem is preferably, though not necessarily, reduced in size and is provided with screw threads 9. At the upper end of the stem is a wheel (not shown) of the ordinary type or other device, by means of which the stem may be rotated. Surrounding the stem, and within the opening 4, are packing rings 10 and a gasket 11 of the ordinary type, which are forced downward in place by means of the gland 12. This gland is secured in position by means of a cover 13. The cover is provided with screw threads 14, which engage with the threads 9 on the stem 6, and with a depending annular portion 15 having internal threads 16, which engage with threads 17 formed upon the outside of the body 1. The threads 16 and 17 serve to secure the cover in place upon the body, and to place the packing under pressure, and I denominate these as "securing threads;" the threads 9 and 14 serve as a means of adjustment for the valve stem, and these I call the "adjusting threads." The valve stem preferably engages with considerable resistance with the packing and the interior of the opening 3, so that when the adjusting means is removed it will remain in position.

The adjusting threads 9 and 14, and the securing threads 16 and 17 are all of the same pitch, so that the valve stem being once adjusted in position, the cover may be removed, or the pressure upon the packing adjusted without varying the relative position of the valve face and the valve seat. This is important in ice-making machines, especially of the automatic variety, in which the valve stem is moved by machinery, which cannot be readily disconnected.

The valve seat may be readily ground by removing the cap 13, the stem being steadied by means of the packing rings 10, gasket 11, and the opening 3, the valve stem being rotated in the usual manner.

The central opening 3 connects with one face 2 of the valve body by means of a lateral passage or port 18. A second lateral passage or port 19 extends from the opposite face of the valve body to a point adjacent to the medial line of the same, and this passage communicates with the valve seat by means of a short opening or chamber 20, which is preferably smaller than the central opening 3. The passages 18 and 19 are preferably diagonally arranged as shown in Fig. 1, so that their outside extremities will be nearly or exactly upon the same lateral plane.

The passage 19, which it is to be understood is the entrance passage for the gas, is provided with a chamber 21, having an enlargement 22, the connecting point of the two forming a shoulder 23. Upon this shoulder and within the enlargement 22 is a screen 24, of sufficiently fine mesh to intercept all foreign matters which may pass from the pipes, compressor, etc., into the chamber 21.

I regard the location of this screen at this point to be a great improvement over that which has been done before, as in ammonia refrigerating apparatus it is found almost impossible to entirely clean the pipes, compressor and tanks, and keep them in a condition entirely free from foreign matter. With the screen located in this position it is only the foreign matter which might be within the chamber 21, and passages 19 and 20, that will pass into the valve, and these portions of the valve may be readily cleaned and kept so.

The pipes 25 and 26 to which the valve is attached are screw-threaded, or otherwise secured to the tie plates 27, which are secured to the flat faces 2, 2, of the valve body. These tie plates are secured together and to the valve body by any suitable means, but preferably by the tie bolts 28, one passing on each side of the valve body. These bolts are provided with adjusting nuts 29, by means of which they may be forced against the valve body with adjustable pressure.

In order to make a tight joint between the plates 27 and the valve body, the former are provided with an annular flange 30, which engages within an annular seat 31 formed upon each of the faces 2, 2, of the valve body. A gasket 32 within each of the annular seats forms a tight joint, it being understood that the tie bolts 28 are used to force the tie plates 27 toward each other with a sufficient amount of pressure to enable this to be done.

By constructing the valve as has been described and illustrated it is possible to make it out of solid stock, by using a piece of steel or other metal, shaping it to the outline of the valve body, and drilling the necessary holes to make the passages and the valve seat. The body being clamped between the two plates 27 tight joints being secured by means of the annular flanges and seats, and the body supported in position, the need of integral flanges is not necessary, and the body therefore does not have to be made of cast metal or a drop forging. This is a very important feature in an ammonia valve as cast metal is unsuitable and undesirable, for this purpose, owing to the presence of air holes and faults, while drop forgings are themselves costly and require expensive finishing. The valve is also made very simple, and the passages are rendered more accessible than is the case with a cast metal structure with integral flanges.

My invention may be modified as desired without departing from the spirit of the invention, and it is to be understood that it is not to be limited to expansion valves, but as much of the invention as can be applied to other uses is to be considered to be within the scope of the present invention.

Having now described my invention, what I claim as new and desire to secure by Letters Patent, is:—

1. A valve, wherein the cover is provided with securing threads engaging with the body and adjusting threads engaging with the stem, both threads being of the same pitch, whereby the cover can be removed or replaced without changing the position of the stem.

2. The combination with a body, having a cylindrical chamber and a valve seat therein, of a stem having a cylindrical portion and a face, and a cover, the said cover having securing threads engaging with the body and adjusting threads engaging with the stem, the said threads being of the same pitch.

3. The combination with a body, having a valve seat and a threaded portion, of a stem within the body and adapted to be rotated and moved longitudinally therein to and away from the seat, the said stem having a threaded portion, and a cover surrounding the stem and engaging with the threads thereon and with the threads on the body, the threads on the stem and body being of the same pitch.

4. The combination with a body, having a valve seat and a threaded portion, of a stem within the body and adapted to be rotated and moved longitudinally therein to and away from the seat, the said stem having a threaded portion, a gland within the body and surrounding the stem, and a cover surrounding the stem and engaging with the threads thereon and with the threads on the body and with the gland, the threads on the stem and body being of the same pitch.

5. The combination with a body, having a valve seat and an external threaded portion, of a stem within the body and adapted to be rotated and moved longitudinally therein to and away from the seat, the said stem having a threaded portion and a cover surrounding the same and engaging with the threads thereon and having an annular depending portion engaging with the threads on the body, the threads on the stem and body being of the same pitch.

6. A valve having a body made of a solid block with a passage drilled therethrough and having a valve seat and a movable valve therein, the sides of the block through which the passage extends having plane opposing faces, concentric seats around the passage, pipes having tie-plates which engage with the seats, and tie-bolts for compressing the plates against the seats and securing the pipes to the body of the valve.

7. A valve having a body formed of a block having a valve therein, a passage therethrough, the said passage having a shoulder therein and a pipe with a tie-plate, the said tie-plate being compressed against the body, and a screen in the passage and on the shoulder so that upon the plate being removed the screen will be exposed.

This specification signed and witnessed this 5th day of January 1904.

RICHARD WHITAKER.

Witnesses:
LEONARD H. DYER,
JNO. ROB'T TAYLOR.